United States Patent
Fukue et al.

(10) Patent No.: US 8,597,774 B2
(45) Date of Patent: Dec. 3, 2013

(54) LASER-MARKING FILM

(75) Inventors: Keiji Fukue, Yokohama (JP); Atsushi Fukahori, Yokohama (JP); Machiko Sugiyama, Yokohama (JP); Shinji Tanaka, Yokohama (JP); Jun Matsushima, Yokohama (JP)

(73) Assignee: Toyo Seikan Kaisha, Ltd., Tokyo (JP)

( * ) Notice: Subject to any disclaimer, the term of this patent is extended or adjusted under 35 U.S.C. 154(b) by 0 days.

(21) Appl. No.: 13/806,466

(22) PCT Filed: Jun. 23, 2011

(86) PCT No.: PCT/JP2011/064441
§ 371 (c)(1),
(2), (4) Date: Dec. 21, 2012

(87) PCT Pub. No.: WO2012/008278
PCT Pub. Date: Jan. 19, 2012

(65) Prior Publication Data
US 2013/0095259 A1   Apr. 18, 2013

(30) Foreign Application Priority Data
Jul. 15, 2010   (JP) ................. 2010-160453

(51) Int. Cl.
*B41M 5/00* (2006.01)
*B41M 5/52* (2006.01)
*B41M 5/10* (2006.01)
*C23C 30/00* (2006.01)
*F01D 5/28* (2006.01)
*G03G 7/00* (2006.01)

(52) U.S. Cl.
CPC ........... *B41M 5/5218* (2013.01); *B41M 5/5254* (2013.01); *B41M 5/10* (2013.01); *C23C 30/00* (2013.01); *F01D 5/288* (2013.01); *G03G 7/0013* (2013.01); *G11B 5/707678* (2013.01); *Y10S 428/9133* (2013.01)
USPC ........... 428/206; 428/207; 428/329; 428/701; 428/913.3

(58) Field of Classification Search
CPC .... B41M 5/5218; B41M 5/5254; B41M 5/10; C23C 30/00; F01B 5/288; G03G 7/0013; G11B 5/707678
USPC ........................ 428/206, 207, 329, 701, 913.3
See application file for complete search history.

(56) References Cited

U.S. PATENT DOCUMENTS

| | | | |
|---|---|---|---|
| 6,423,399 B1 * | 7/2002 | Endo et al. ..................... | 428/206 |
| 8,081,358 B2 * | 12/2011 | Watanabe et al. ................. | 359/2 |
| 2006/0141391 A1 * | 6/2006 | Klein et al. ................. | 430/270.1 |
| 2011/0069134 A1 * | 3/2011 | Sakagami et al. ............. | 347/224 |

FOREIGN PATENT DOCUMENTS

| | | |
|---|---|---|
| JP | 3-270980 A | 12/1991 |
| JP | 5-077068 A | 3/1993 |

(Continued)

*Primary Examiner* — Betelhem Shewareged
(74) *Attorney, Agent, or Firm* — Sughrue Mion, PLLC

(57) ABSTRACT

To provide a laser-marking film having a laser-marking ink layer capable of forming vivid images when it is irradiated with a laser beam for forming laser markings. A laser-marking film comprising a base film 1, a white underlying layer 3 formed on the base film 1, and an ink layer 5 for laser marking formed on the underlying layer 3, wherein the ink layer 5 contains, dispersed therein, an iron oxide as a laser beam-absorbing agent in an amount of 0.1 to 30 parts by weight per 100 parts by weight of a resin binder.

6 Claims, 1 Drawing Sheet

(56) References Cited

FOREIGN PATENT DOCUMENTS

| JP | 9-123607 A | 5/1997 |
| JP | 2001-113830 A | 4/2001 |
| JP | 2008-144082 A | 6/2008 |
| JP | 2009-083185 A | 4/2009 |
| JP | 4379668 B2 | 12/2009 |

* cited by examiner

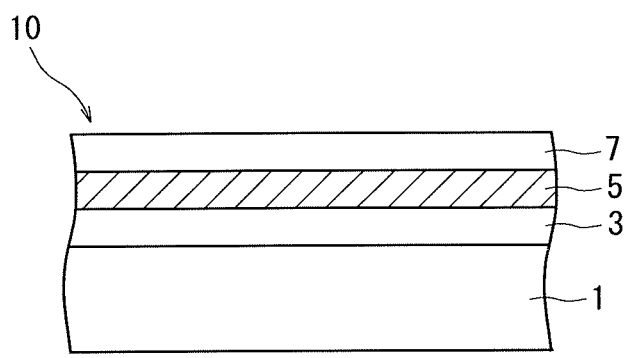

LASER-MARKING FILM

TECHNICAL FIELD

This invention relates to a laser-marking film provided with an ink layer capable of forming markings by the irradiation with a laser beam.

BACKGROUND ART

So far, the product data such as a variety of distribution data (date of production, eat-by freshness date, etc.) and product management data (serial number, etc.) have been printed on the industrial products in the form of line images such as bar codes and characters.

As the systems for printing the above product data, there have, generally, been known a thermal transfer system, an ink jet system and a laser system. Among them, however, the printing system based on the laser beam has now been widely employed. Namely, according to the laser system, a layer blended with a laser beam-absorbing agent and for forming laser markings is irradiated with a laser beam, and the surrounding resin is carbonized by the heat generated by the laser beam-absorbing agent to thereby form a black image. According to this system, the laser marking can be printed in the printing layer in a state where a transparent or semi-transparent protection layer is formed on the printing layer offering various advantages such as there is no need of forming a protection layer after the printing and, besides, printing can be easily done on the solid portions, too, and so on.

There have been proposed a variety of inks for use in forming the layers for printing laser markings, and a variety of laminates having a layer for printing laser markings (see patent documents 1 to 5).
Prior Art Documents:
Patent Documents
Patent document 1: JP-A-2009-83185
Patent document 2: JP-A-03-270980
Patent document 3: JP-A-2001-113830
Patent document 4: JP-A-2008-144082
Patent document 5: Japanese Patent No. 4379668

OUTLINE OF THE INVENTION

Problems that the Invention is to Solve

If it is attempted to form a layer for printing laser markings by using, for example, a gravure ink in which an organic pigment or dye is dispersed, the heat is not sufficiently generated despite the layer is irradiated with a laser beam because of a low laser beam absorption and, therefore, images for representing the data are not vividly formed. Therefore, the above patent document 1 and other patent documents are proposing to use, as inks dedicated to printing laser markings, the inks comprising a resin solution in which is dispersed a pigment of high laser beam absorption, for example, a pearl pigment obtained by doping mica with various metals or metal oxides.

However, the inks dedicated to the laser marking in which the above pearl pigment is dispersed, have a problem that it is difficult to form a layer for laser marking that exhibits homogeneous laser absorption. That is, the pearl pigment exhibits high laser beam absorbability but disperses poorly. Therefore, if the layer for laser marking is formed by using the ink in which the pearl pigment is dispersed, the layer assumes irregular thickness and the pearl pigment disperses unhomogeneously causing variation in the laser-absorbing property. As a result, when irradiated with the laser beam, vivid image regions and nonvivid regions are formed.

Further, the above patent documents are proposing the use of inorganic pigments other than the pearl pigment, and are teaching the use of a variety of metal oxides as laser beam absorbing agents. If compared with the pearl pigment, however, the metal oxides shown by the above patent documents little absorb the laser beam (usually long wavelengths) for forming laser markings. Therefore, the inks in which the metal oxides are dispersed are not still capable of forming vivid images upon the irradiation with the laser beam.

Therefore, the object of the present invention is to provide a laser-marking film having a laser-marking ink layer capable of forming vivid images when it is irradiated with a laser beam for forming laser markings.

Means for Solving the Problems

The present inventors have extensively studied the inks for laser marking, have discovered that among many metal oxides, the iron oxide and, specifically, reddish brown iron oxide highly absorbs laser beam that is used for laser marking, the ink blended with such an iron oxide as a laser beam-absorbing agent is capable of forming vivid laser markings by the irradiation with a laser beam and, specifically, when an ink layer in which the reddish brown iron oxide is dispersed is formed on the white underlying layer, very vivid laser markings can be formed, and have thus completed the invention.

Namely, according to the present invention, there is provided a laser-marking film comprising a base film, a white underlying layer formed on the base film, and an ink layer for laser marking formed on the underlying layer, wherein the ink layer for laser marking contains, dispersed therein, an iron oxide as a laser beam-absorbing agent in an amount of 0.1 to 30 parts by weight per 100 parts by weight of a resin binder.

In the laser-marking film of the present invention, it is desired that:
(1) The ink layer, further, contains, dispersed therein, a white pigment;
(2) The ink layer contains, dispersed therein, the oxide iron and the white pigment at a weight ratio of 1:5 to 1:8000;
(3) The iron oxide is a reddish brown iron oxide;
(4) A transparent or semi-transparent protection layer is formed on the ink layer; and
(5) The laser-marking film is used as a packing material.

Effects of the Invention

If the laser-marking film of the invention is irradiated with a laser beam for laser marking, the portion irradiated with the laser beam in the ink layer formed in the film generates heat, and the resin component of the irradiated portion is carbonized and is discolored into black forming a vivid marking in the ink layer.

Further, the laser-marking film of the present invention is very inexpensive as compared to those having an ink layer formed by using, for example, a pearl pigment and, therefore, makes it possible to greatly decrease the cost.

Further, the packing materials (e.g., pouch, etc.) for containing a variety of kinds of contents must display correct information of the contents. The laser-marking film of the present invention is capable of vividly forming bar codes and character images for displaying a variety kinds of information by the irradiation with a laser beam, and is very useful for the packing materials.

In the present invention, the reddish brown iron oxide is an iron oxide pigment which chiefly comprises a —$Fe_2O_3$ and of which the color is adjusted to be reddish brown by adjusting the particle diameter thereof. Its average color tone assumes an L*-value of 40, an a*-value of 25 and a b*-value of 17 (average values with n=3) in the L*a*b* color system. The above values are measured in compliance with the method specified under the JIS Z 8722 and, in the present invention, are measured by using a measuring instrument that complies with the above JIS, i.e., by using a spectroscopic color-difference meter SE2000 manufactured by Nippon Denshoku Industries Co, Ltd.

So far, it has been proposed to use the reddish brown iron oxide (red iron oxide) and the yellow iron oxide as a laser beam-absorbing agent, and it has been urged to further improve the vividness of the laser markings that are formed by irradiating the ink layer in which the above pigments are dispersed with a YAG laser beam of a wavelength of 1064 nm. By using the ink layer formed by using an ink blended with the iron oxide and, specifically, with the reddish brown iron oxide in accordance with the present invention, on the other hand, it was made possible to form more vivid laser markings by the irradiation with the same laser beam as demonstrated in the Experimental Examples appearing layer.

It is, further, important that the laser-marking film of the present invention is provided with a white underlying layer between the ink layer in which the above iron oxide is dispersed in a resin binder and the base film. Provision of the underlying layer makes it possible to form a very vivid laser marking. That is, when the ink layer is irradiated with the laser beam, the beam reflected by the white underlying layer enters into the ink layer whereby the laser beam is sufficiently absorbed by the iron oxide. As a result, heat is generated in large amounts to form very vivid laser markings. If the ink layer in which the iron oxide is dispersed is formed directly on the base film without forming the above white underlying layer, the formed laser marking has poor vividness.

In the laser-marking film of the present invention, further, a white pigment is dispersed together with the iron oxide in the ink layer making it possible to form a more vivid laser marking. Namely, the laser beam incident on the ink layer scatters by being reflected by the white pigment, and the iron oxide is irradiated with more laser beam. Therefore, the laser beam is absorbed by the iron oxide particles from the surface of the ink layer up to the bottom thereof, more heat is generated and, as a result, more vivid laser marking is formed.

Further, what the laser-marking film of the present invention needs is the above iron oxide, i.e., the reddish brown iron oxide that is easily available and is inexpensive, enabling the laser beam to be more absorbed and the laser marking to be formed more vividly.

BRIEF DESCRIPTION OF THE DRAWING

[FIG. 1] is a sectional view schematically illustrating the structure of layers of a laser-marking film of the present invention.

MODES FOR CARRYING OUT THE INVENTION

Referring to FIG. 1, the laser-marking film of the invention generally designated at 10 includes a base film 1, a white underlying layer 3 formed on the base film 1, and an ink layer 5 for laser marking which is formed on the underlying layer 3 and in which an iron oxide is dispersed. Usually, a protection layer 7 is formed on the ink layer 5.

<Base Film 1>

As the base film 1, there can be used various kinds of papers, resin films and metal foils such as aluminum foil coated with a resin depending on the use of the laser-marking film 10. Usually, however, a resin film is preferred from the standpoint of general use.

There is no particular limitation on the resin material for forming the resin film. Generally, however, there can be used a variety of kinds of thermoplastic resins, i.e., polyolefins or cyclic olefin copolymers such as low-density polyethylene, high-density polyethylene, polypropylene, poly 1-butene, poly 4-methyl-1-pentene, or random or block copolymers of α-olefins of ethylene, propylene, 1-butene, and 4-methyl-1-pentene; ethylene-vinyl compound copolymers such as ethylene-vinyl acetate copolymer, ethylene-vinyl alcohol copolymer and ethylene-vinyl chloride copolymer; styrene resins such as polystyrene, acrylonitrile styrene copolymer, ABS, and α-methylstyrene-styrene copolymer; polyvinyl compounds such as vinyl polychloride, vinylidene polychloride, vinyl chloride-vinylidene chloride copolymer, methyl polyacrylate, and methyl polymethacrylate; polyamides such as nylon 6, nylon 6-6, nylon 6-10, nylon 11 and nylon 12; thermoplastic polyesters such as polyethylene terephthalate, polybutylene terephthalate and polyethylene naphthalate; polycarbonates; polyphenylene oxides; biodegradable resins such as polylactic acid and the like; or any resin selected out of the mixtures thereof. The resin film may assume a suitable structure of layers, such as a single-layer structure or a multi-layer structure depending on the use of the laser-marking film 10. For example, if the laser-marking film 10 is to be used for obtaining packing materials such as pouch and the like, then it is desired to employ a multi-layer structure comprising inner and outer layers of an olefin resin or a polyester resin, and an intermediate layer of a resin having excellent gas-barrier property, such as ethylene vinyl alcohol copolymer, that are provided interposing adhesive layers among them.

Further, the resin film may have a thickness lying in a suitable range depending upon the use thereof.

<White Underlying Layer 3>

The white underlying layer 3 is formed for elevating the generation of heat as the laser beam is absorbed by the ink layer 5 formed thereon. Upon forming the underlying layer 3, the iron oxide particles in the ink layer 5 absorb the laser beam reflected by the surface of the underlying layer 3, too, at the time of conducting the laser marking and generate heat making it possible to form more vivid laser markings.

The underlying layer 3 is a white layer formed all over the surface and in which the white pigment is dispersed as an inorganic pigment in the resin binder. The white pigment is a known one and is, representatively, amorphous silica, titanium oxide, calcium carbonate, clay or talc, and desirably has an average particle diameter $D_{50}$ on the volume basis, usually, in a range of about 0.1 to about 3,μm as measured by the laser diffraction-light scattering method from the standpoint of maintaining sufficiently high laser beam-reflecting property.

There is no particular limitation on the amount of the white pigment or on the thickness of the underlying layer 3 provided a sufficient hiding power is exhibited. Usually, however, the amount of the white pigment in the underlying layer 3 may be from 100 to 300 parts by weight per 100 parts by weight of the resin, and the thickness of the underlying layer 3 may be from about 0.1 to about 10 μm. If the amount of the white pigment is too small or if the thickness of the underlying layer 3 is too small, the laser beam is not sufficiently reflected by the underlying layer 3, the laser beam is not sufficiently absorbed by the iron oxide dispersed in the ink layer 5, and the laser marking may become less vivid. Further, if the amount of the white pigment is too large, the underlying layer 3 does not sufficiently adhere to the base film 1 or to the ink layer 5 and delamination may easily occur. Further, even if the thickness of the underlying layer 3 is unnecessarily increased, the thickness of the film 10 simply becomes unnecessarily thick spoiling advantage in economy and posing limitation on the use of the film 10. As the resin material for forming the underlying layer 3, there is used the same resin material as the one used for the ink layer as will be described later.

<Ink Layer 5 for Laser Marking>

In the ink layer 5 for laser marking formed on the underlying layer 3, as described above, the resin binder has been blended with the iron oxide as a laser beam-absorbing agent. When the film 10 is irradiated with the laser beam for laser marking, therefore, the iron oxide absorbs the laser beam in the portions irradiated with the laser beam and generates heat causing the resin to be carbonized. Due to the blackening by carbonization, a laser marking is formed in the ink layer 5.

In the ink layer 5, the iron oxide is used in an amount of 0.1 to 30 parts by weight and, specifically, 0.2 to 20 parts by weight per 100 parts by weight of the resin binder. If the amount thereof is small, the laser beam is not sufficiently absorbed when the ink layer formed by using the ink is irradiated with the laser beam for laser marking, and carbonization (thermal decomposition) of the resin does not occur to a sufficient degree making it difficult to form vivid laser marking. If the iron oxide particles are blended in too large amounts, on the other hand, the thickness of the ink layer 5 becomes irregular causing variation in the laser-absorbing property and, therefore, a decrease in the legibility of black laser marking. Or a decrease in the amount of the resin causes the laser marking to become obscure.

Upon using the reddish brown iron oxide which is easily available and inexpensive as the iron oxide as described above, absorption of the laser beam is improved and more vivid laser marking can be formed.

In the present invention, it is desired to use the white pigment together with the above iron oxide particles. Upon using the white pigment in combination, the laser beam is reflected and scattered in the ink layer 5 that is formed. As a result, the laser beam is more absorbed by the iron oxide to generate more heat, and a more vivid laser marking is formed.

The white pigment may be the one dispersed in the above-mentioned underlying layer 3, i.e., may be amorphous silica, titanium oxide, calcium carbonate, clay or talc. Usually, the white pigment is desirably used in such an amount that the weight ratio of the iron oxide particles (A) to the white pigment particles (B) is in a range of 1:5 to 1:8000 and, specifically, 1:20 to 1:2000 (A:B). If the amount of the white pigment particles is small, absorption of the laser beam by the reflection by the white pigment particles is not so improved. If the amount thereof is too large, on the other hand, the laser beam is much reflected by the surface of the ink layer 5. As a result, absorption of the laser beam decreases, and the laser marking may not be vividly formed. Besides, the total amount of the inorganic pigments increases and, therefore, the thickness of the ink layer 5 becomes irregular causing a dispersion in the absorption of the laser beam.

It is desired that the above-mentioned iron oxide particles and white pigment particles have suitable particle diameters so as to be homogeneously dispersed in the resin binder and so as to absorb the laser beam and reflect the laser beam to a sufficient degree. Usually, it is desired that they have an average particle diameter $D_{50}$ based on the volume in a range of from about 0.1 to about 3,μm as measured by the laser diffraction light scattering method like the white pigment in the underlying layer 3 as mentioned above.

The thickness of the ink layer 5 for laser marking is, preferably, in a range of 0.1 to 10,μm and, specifically, 0.5 to 5,μm. If the ink layer 5 is too thin, the resin is decomposed and carbonized in small amounts by the irradiation with the laser beam and it becomes difficult to obtain vivid laser markings. If the ink layer 5 is too thick, on the other hand, the laser-marking film 10 becomes unnecessarily thick posing limitation on the use thereof without offering any advantage.

<Protection Layer 7>

The protection layer 7 is provided as required on the ink layer 5 to protect laser markings formed in the ink layer 5. The protection layer 7 is formed by using a semi-transparent or transparent resin which permits the passage of laser beam for laser marking.

The protection layer 7 is formed by using a resin selected out of thermoplastic or thermosetting resins such as olefin resin; acrylic resin; ethylene-ethyl acrylate copolymer resin; ethylene-vinyl acetate copolymer resin; vinyl chloride resin; polyester resins such as polyethylene terephthalate; polyvinyl acetate resin; polystyrene resin; polyimide resin; polycarbonate resin; polyurethane resin; epoxy resin; silicone resin; and fluorine-contained resin;, depending upon the kind of the laser beam used for laser marking.

The thickness of the protection layer 7 may be such that transparency thereof is maintained to a degree that enables the laser markings formed in the ink layer 5 to be legible through the protection layer 7 and such that the laser markings can be protected.

<Production of the Laser-Marking Film 10>

The laser-marking film 10 having the above-mentioned structure of layers is produced by using an ink for forming the ink layer 5 for laser marking and an ink for forming the underlying layer 3 to form the ink layer 5 and the underlying layer 3 successively on the protection layer 7, and sticking them to the base film 1 via an adhesive (not shown).

The ink for forming the underlying layer 3 and the ink for forming the ink layer 5 each contain, depending on the layer compositions, inorganic pigments such as the white pigment and iron oxide (laser beam-absorbing agent) as described above, as well as the resin binder and the organic solvent as basic components.

There is no particular limitation on the resin binder used for the ink for forming the ink layer 5 so far as it is quickly decomposed and carbonized by heat generated as the laser beam is absorbed by the iron oxide. Typically, however, there can be used acrylic resin, polyamide resin, urethane resin, polypropylene chloride, rubber chloride, polyester resin and nitrocellulose. The resin binder used for the ink for forming the underlying layer 3 is free of the above limitation, and may be any resin so far as it is capable of forming a film. Usually, however, the resin binder is of the same kind as the resin binder used for forming the ink layer 5 by taking into consideration the adhesion to the ink layer 5 formed on the underlying layer 3.

There is no particular limitation on the organic solvent provided it is capable of dissolving the above-mentioned resin binder. Usually, however, there is used the one that has a low boiling point and easily volatilizes for the ink for forming either the underlying layer 3 or the ink layer 5. There can be selected any suitable organic solvent out of the aromatic hydrocarbon solvents such as benzene, toluene and xylene; ester solvents such as ethyl acetate and butyl acetate; alcohol solvents such as methanol, ethanol, isopropanol and butanol; and ketone solvents such as acetone, methyl ethyl ketone and methylisobutyl ketone, depending upon the kind of the resin binder.

The organic solvent is used in such an amount that the viscosity of the ink obtained by mixing the components lies in a range suited for forming the layer by coating and is, usually, used in such an amount that the solid component concentration of the ink is from about 15 to about 50% by weight though it may vary depending on the inorganic pigment that is added.

Further, the ink may be blended, in addition to the above-mentioned components, with a variety of assistants such as surfactant, antioxidant, anticharging agent, defoaming agent and the like by taking into consideration the printability and physical properties of the ink like the conventional inks. The amount of blending should be such that the properties of the underlying layer 3 and the ink layer 5 are not spoiled. As required, further, the ink may be suitably blended with an inorganic pigment or an organic pigment as a coloring agent in addition to the above iron oxide particles and white pigment particles. In this case, the hue should be of a kind that does not spoil the legibility of black laser markings formed by the irradiation with a laser beam.

The above ink can be prepared by a method known per se. For example, the above resin binder is dissolved in the organic solvent to prepare a vehicle and to which inorganic pigments (iron oxide particles and white pigment particles) are mixed. As required, further, various additives are added and mixed thereto.

The ink layer 5 for laser marking and the white underlying layer 3 are formed by applying the above-mentioned inks onto the protection layer 7 or onto the ink layer 5 for laser marking by the known method followed by drying. Namely, the inks are applied by, for example, gravure printing, screen printing or blade coating to such a degree that the layer after dried assumes a predetermined thickness. The inks are, thereafter, dried to volatilize the organic solvent to thereby form the ink layer 5 for laser marking and the white underlying layer 3.

The protection layer 7 can be easily formed, depending on the kinds of the consistuent resin, by means of an extrusion lamination or by such means as applying a resin solution, drying it (removal of the solvent) and curing it by heat, electron ray or ultraviolet ray.

<Laser-Marking Film 10>

The laser-marking film 10 formed as described above can be used for a variety of applications since it is capable of vividly forming laser markings in the ink layer 5 by the irradiation with a laser beam through the protection layer 7.

For instance, the film 10 is cut into a suitable size, is stuck to a predetermined portion of packing containers such as metal cans and plastic containers and a variety kinds of industrial products by means of heat-sealing or by using a suitable adhesive depending on the kind of the base film 1, and is caused to form laser markings which shows various information of barcodes and characters so as to serve as a printed film. Further, the film 10 by itself can be so stuck as to form a packing material such as bag to contain various beverages and medicines.

Specifically, the laser-marking film 10 of the present invention is capable of very vividly forming laser markings for indicating a variety of kinds of information, and can be most preferably used as a bag for containing beverages and medicines that require the display of correct information.

Depending on the mode of using the film 10, further, images for enhancing decorative appeal are printed by, for example, ink-jet printing onto the portions on the protection layer 7 other than the portion where the laser markings are to be formed and, next, the ink layer 5 for laser marking is formed on the above portion of the protection layer 7. Thereafter, the underlying layer 3 is formed so as to cover the printed images. The film 10 can be used just as described above when it is attempted to form the above-mentioned bag.

As the laser beam for forming laser markings in the ink layer 5 in which the laser marks are to be formed, there can be exemplified a YAG laser, a YVO4 laser and the like lasers. Most preferably used is the YVO4 laser of a wavelength of 1064 nm from the standpoint of cost.

The apparatus for irradiating the laser beam may be the one that has heretofore been used in this field of art.

EXPERIMENTAL EXAMPLES

The present invention is described by the following experiments. Described below are evaluation of markings, laser beam irradiation conditions employed for the laser marking and the reddish brown iron oxide used in the experiments described below.

[Evaluation]

Vividness of the ink for laser marking after irradiated with the laser beam was confirmed with the eye. The evaluation was on the following basis.

⊚: Very vivid.
○: Vivid.
Δ: Not so vivid.
X: Not vivid.

<Laser Irradiation Conditions>

Apparatus for laser beam irradiation:
Three-dimensional YVO4 laser marker manufactured by Keyence Co.
Laser beam wavelength: 1064 nm
Laser beam output range: 35% to 50% at 50 watts <Iron Oxide>
Reddish brown iron oxide ($\alpha$-$Fe_2O_3$), particle diameter: 1 to 2 μm Experimental Example 1

An ink for laser marking was prepared by using an urethane resin as a resin binder, a reddish brown iron oxide comprising red ion oxide as an inorganic pigment, a titanium oxide as a white inorganic pigment and a toluene.MEK (methyl ethyl ketone).IPA (isopropyl alcohol) as an organic solvent. The reddish brown iron oxide was used in an amount of 3 parts by weight and the titanium oxide was used in an amount of 810 parts by weight per 100 parts by weight of the resin binder (i.e., the weight ratio of reddish brown iron oxide:titanium oxide was 1:270).

Next, the ink for laser marking was printed on a 12 μm-thick protection layer of polyethylene terephthalate and was dried to form an ink layer and on which was formed a 3 μm-thick underlying layer of urethane resin containing titanium oxide that was a white inorganic pigment. Thereafter, a 70 μm-thick base film of polypropylene was stuck thereto via an adhesive, and the thus obtained film was irradiated with a laser beam from the side of the protection film under the above-mentioned conditions.

The evaluated results were as shown in Table 1.

Experimental Example 2

A film was prepared in the same manner as in Experimental Example 1 but without adding the titanium oxide that was the white inorganic pigment to the ink for laser marking and without forming the underlying layer. The film was irradiated with the laser beam and was evaluated in the same manner as in Experimental Example 1.

Experimental Example 3

A film was prepared in the same manner as in Experimental Example 1 but without adding the titanium oxide that was the white inorganic pigment to the ink for laser marking. The film was irradiated with the laser beam and was evaluated in the same manner as in Experimental Example 1.

Experimental Example 4

A film was prepared in the same manner as in Experimental Example 1 but without forming the underlying layer. The film was irradiated with the laser beam and was evaluated in the same manner as in Experimental Example 1.

Experimental Example 5

A film was prepared in the same manner as in Experimental Example 3 but using, as the ink for laser marking, only a pearl pigment obtained by doping the mica which was an inorganic pigment with various metals or metal oxides. The film was irradiated with the laser beam and was evaluated in the same manner as in Experimental Example 3.

Experimental Example 6

A film was prepared in the same manner as in Experimental Example 4 but adding a yellow iron oxide instead of the reddish brown iron oxide to the ink for laser marking. The film was irradiated with the laser beam and was evaluated in the same manner as in Experimental Example 4.

Experimental Example 7

A film was prepared in the same manner as in Experimental Example 4 but adding a black iron oxide instead of the redsiag brown iron oxide to the ink for laser marking. The film was irradiated with the laser beam and was evaluated in the same manner as in Experimental Example 4.

TABLE 1

|  | Inorganic pigment | White underlying layer | Vividness of marking |
| --- | --- | --- | --- |
| Experiment 1 | reddish brown iron oxide, white inorganic pigment | formed | ⊚ |
| Experiment 2 | reddish brown iron oxide | not formed | x |
| Experiment 3 | reddish brown iron oxide | formed | ○ |
| Experiment 4 | reddish brown iron oxide, white inorganic pigment | not formed | Δ |
| Experiment 5 | pearl pigment | formed | Δ |
| Experiment 6 | yellow iron oxide, white inorganic pigment | not formed | Δ |
| Experiment 7 | black iron oxide, white inorganic pigment | not formed | Δ |

| Description of Reference Numerals: | |
| --- | --- |
| 1: | base material |
| 3: | white underlying layer |
| 5: | ink layer for laser marking |
| 7: | protection layer |

The invention claimed is:

1. A laser-marking film comprising a base film, a white underlying layer formed on the base film, and an ink layer for laser marking formed on the underlying layer, wherein the ink layer for laser marking contains, dispersed therein, an iron oxide as a laser beam-absorbing agent in an amount of 0.1 to 30 parts by weight per 100 parts by weight of a resin binder.

2. The laser-marking film according to claim 1, wherein the ink layer, further, contains, dispersed therein, a white pigment.

3. The laser-marking film according to claim 2, wherein the ink layer contains, dispersed therein, the iron oxide and the white pigment at a weight ratio of 1:5 to 1:8000.

4. The laser-marking film according to claim 1, wherein the iron oxide is a reddish brown iron oxide.

5. The laser-marking film according to claim 1, wherein a transparent or semi-transparent protection layer is formed on the ink layer.

6. A packing material comprising the laser-marking film of claim 1.

* * * * *